United States Patent [19]

Ozora

[11] Patent Number: 5,040,805
[45] Date of Patent: Aug. 20, 1991

[54] SPHERICAL SEALING BODY USED FOR EXHAUST PIPE JOINT AND MANUFACTURING METHOD THEREOF

[75] Inventor: Kazuo Ozora, Fujisawa, Japan
[73] Assignee: Oiles Corporation, Tokyo, Japan
[21] Appl. No.: 430,363
[22] Filed: Nov. 2, 1989
[51] Int. Cl.⁵ .................. F16J 15/12; F16L 55/04
[52] U.S. Cl. .................. 277/235 R; 277/30; 277/235 A; 277/DIG. 6; 285/267; 285/910
[58] Field of Search .......... 277/30, 227, 229, 230, 277/235 R, 235 A, DIG. 6, 98–100; 384/902; 428/245, 247, 591, 609; 285/261, 266–268, 910

[56] References Cited

U.S. PATENT DOCUMENTS

| | | | |
|---|---|---|---|
| 2,995,462 | 8/1961 | Mitchell et al. | 384/902 X |
| 4,208,472 | 6/1980 | Cho et al. | 384/902 X |
| 4,305,567 | 12/1981 | Lunt | 277/DIG. 6 X |
| 4,377,892 | 3/1983 | Gonzalez | 277/DIG. 6 X |
| 4,417,733 | 11/1983 | Usher . | |
| 4,423,544 | 1/1984 | Kashmerick et al. | 277/DIG. 6 X |
| 4,462,603 | 7/1984 | Usher et al. | 277/DIG. 6 X |
| 4,516,782 | 5/1985 | Usher . | |
| 4,547,434 | 10/1985 | Sumiyoshi et al. . | |
| 4,551,393 | 11/1985 | Sumiyoshi et al. . | |
| 4,554,084 | 11/1985 | Lonne et al. | 277/DIG. 6 X |
| 4,559,248 | 12/1985 | Sumiyoshi et al. . | |
| 4,559,249 | 12/1985 | Arigaya et al. . | |
| 4,582,368 | 4/1986 | Fujita et al. | 384/902 X |
| 4,600,201 | 7/1986 | Lonne et al. | 277/DIG. 6 X |
| 4,601,476 | 7/1986 | Usher et al. | 277/235 R X |
| 4,607,851 | 8/1986 | Usher . | |
| 4,659,091 | 4/1987 | Baasner et al. | 277/235 R X |
| 4,762,330 | 8/1988 | Lonne et al. | 277/DIG. 6 X |
| 4,871,181 | 10/1989 | Usher et al. | 277/235 R X |
| 4,893,847 | 1/1990 | Hess | 285/910 X |
| 4,902,024 | 2/1990 | Takenoshita | 277/DIG. 6 X |
| 4,928,998 | 5/1990 | Brandener | 285/910 X |

FOREIGN PATENT DOCUMENTS 54-76759 6/1979 Japan .
58-24620 2/1983 Japan .
58-21144 4/1983 Japan .

Primary Examiner—William A. Cuchlinski, Jr.
Assistant Examiner—Scott Cummings
Attorney, Agent, or Firm—Nixon & Vanderhye

[57] ABSTRACT

A spherical sealing body is to be inserted in a space defined by three of an end edge of an exhaust pipe on upstream side, a flange fixed on an outer periphery of the exhaust pipe on upstream side, and a concave spherical portion disposed on an end edge of an exhaust pipe on downstream side. The spherical sealing body comprises a wire mesh body obtained through weaving or knitting a fine metal wire, the metal mesh body has a cylindrical inner circumferential surface of the exhaust pipe on upstream side, a convex outer circumferential surface to be fitted in the concave spherical portion, and a bottom surface on large diameter side to be abutted against the flange. A refractory material is filled in meshes and clearances of a part of the wire mesh body corresponding to the convex outer circumferential face and the bottom face.

9 Claims, 4 Drawing Sheets

FLOW DIRECTION OF EXHAUST GAS

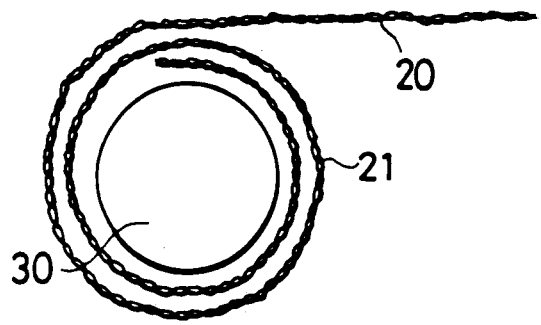
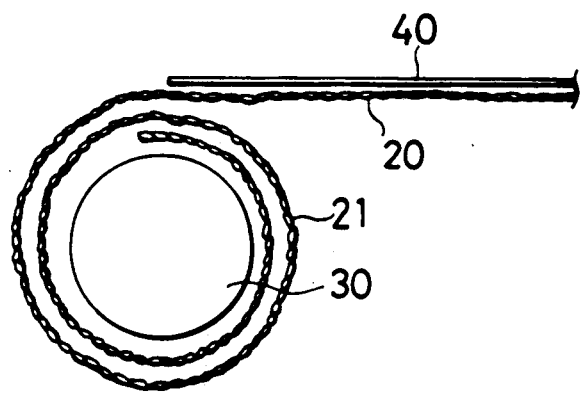
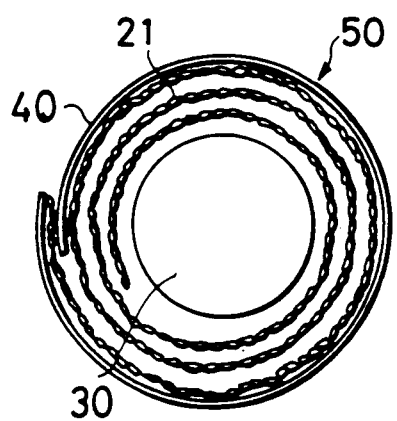
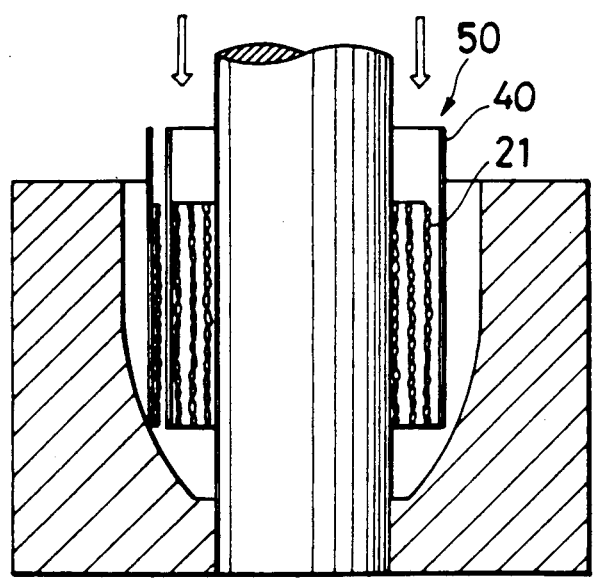
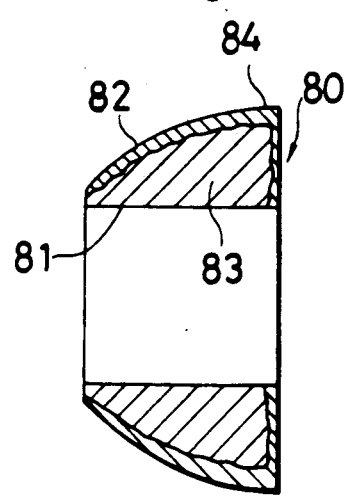

SPHERICAL SEALING BODY USED FOR EXHAUST PIPE JOINT AND MANUFACTURING METHOD THEREOF

BACKGROUND OF THE INVENTION

The present invention relates to a spherical sealing body used for exhaust pipe joints and a manufacturing method thereof.

Exhaust gas from an automobile engine is passed through an exhaust pipe disposed on a car body frame or the like from the engine and discharged into the atmosphere. However, the exhaust pipe is subjected to a repetitive bending stress due to the torque reaction force of the engine, force of inertia and so forth. Particularly in the case of a front wheel drive engine arranged transversely, the bending stress grows heavy as compared with that of an engine arranged longitudinally. Engine vibrations will therefore be brought into the car interior (along with noise) along an exhaust pipe suspension. Thus, not only noise is caused thereby but also a fatigue fracture may result in the exhaust pipe.

To solve such problem, a spherical pipe joint is disposed at a predetermined position along the exhaust pipe to absorb the stress.

A spherical sealing member has been used for conventional spherical pipe joints. It permits relative smooth angular motion between two of the exhaust pipes as the engine rotates relative to the automobile, prevents leakage of an exhaust gas from a pipe joint portion, and absorbs infinitesimal vibrations of the exhaust pipe arising as the automobile engine rotates.

As disclosed, for example, in Japanese Patent Publication (Kokoku) No. 58-21144, a wire mesh and a sheet-like refractory material (expanded graphite sheet, mica sheet or the like) are laminated with each other, wound cylindrically to obtain a preform body, and then the preform body which is compressed axially thereof has been used so far as the spherical sealing member.

The above-described sealing member consisting of a wire mesh and a refractory material has a structural integrity such that the refractory material is filled thoroughly in the wire mesh, thus both are entangled with each other. The refractory material exposed on a convex spherical surface of the sealing member is flexible and hence is easily conformed to the mating surface, therefore preventing leakage of an exhaust gas at the spherical joint. However, since the sealing member itself works as a rigid body to infinitesimal vibrations arising on the exhaust pipe, absorption of the vibrations can hardly be expected, thus leaving the problem of generation of noise due to the vibrations and sound in the car interior.

SUMMARY OF THE INVENTION

An object of the invention is to provide a spherical sealing body for exhaust pipe joints and a manufacturing method therefor, wherein a wire mesh unitary member is preformed and compressed to retain elasticity and absorb vibrations, and, in conjunction with a refractory material overlying certain of its surface, seals the exhaust pipe joint.

The object of the present invention can be achieved by a spherical sealing body for insertion in a space defined by three surfaces: an end edge portion of a first exhaust pipe section of an exhaust pipe, a flange fixed on an outer periphery of the exhaust pipe section, and a concave spherical portion disposed on an end edge of a second exhaust pipe section downstream (atmosphere side) of the first exhaust pipe section. The spherical sealing body comprises a wire mesh body obtained through weaving or knitting a fine metal wire, said metal mesh body having a cylindrical inner circumferential surface to be fitted in an outer circumferential surface of said exhaust pipe on the upstream side, a convex outer circumferential surface to be fitted in said concave spherical portion, and a bottom surface on the large diameter side to be abutted against said flange, and a refractory material which fills in meshes and clearances of the part of the wire mesh body corresponding to the convex outer circumferential face and said bottom face.

Further, the object of the present invention can be achieved by a method of manufacturing a spherical sealing body which is to be inserted in a space defined by an end edge of an exhaust pipe on the upstream side, a flange fixed on an outer periphery of the exhaust pipe on the upstream side, and a concave spherical portion disposed on an end edge of an exhaust pipe on the downstream side, comprising the steps of:

preparing a band-like wire mesh obtained through weaving or knitting a fine metal wire;

winding the wire mesh into a cylinder at least two turns to thereby form a partial cylindrical part;

putting a refractory sheet material wider than the wire mesh over a part of the wire mesh other than the partial cylindrical part;

winding round the partial cylindrical part the part of the wire mesh over which the refractory sheet material is put, to thereby form a preform body with the refractory material sheet projecting from one end of the partial cylindrical part; and compressing the preform body from an outer circumferential side of the preform body and also from one end side of the partial cylindrical part.

In the spherical sealing body and its manufacturing method, a wire mesh obtained from weaving or knitting fine metal wires such as stainless steel wire or iron wire like austenite SUS304, SUS316, ferrite SUS430, zinc-plated iron wire (JIS-G-3532) and the like is used as the wire mesh.

Preferably, 3 to 5 mm mesh size is used for the woven or knitted wire mesh.

An expanded graphite is preferable as the refractory material. "Grafoil (trade name)" by Union Carbide Co., U.S.A., which is disclosed in Japanese Patent Publication No. 44-23966, or "Nicafilm (trade name)" by Nippon Carbon Co., Japan, may be used for the expanded graphite, and a mica paper (sheet) bonded with silicon may be used for the mica.

It is preferable that a sliding member in the manufacturing method according to the invention be made of tetrafluoroethylene resin. The sliding member may comprise: (1) a tetrafluoroethylene resin film or tape placed over the expanded graphite, and which are then compressed on a roller for integration and a tetrafluoroethylene resin layer is formed on one side of the expanded graphite sheet/Alternatively, an expanded graphite sheet is applied over the wire mesh tetrafluoroethylene resin film or tape is further applied over the expanded graphite sheet, these being compressed on a roller for integration, and a tetrafluoroethylene resin layer is formed on the surface.

Then, an unsintered film or tape which is 0.05 to 0.5 mm thick is used for the tetrafluoroethylene resin film or tape, forming the sliding member. For example, an unsintered film or tape of tetrafluoroethylene obtained through a paste extrusion molding of fine powder of tetrafluoroethylene resin (Teflon 6J, Polyflon F101, Fluon CD1 in trade name each) may be used.

The spherical sealing body of the invention is incorporated in the above-mentioned exhaust pipe joint.

That is, an inner peripheral surface of the spherical sealing body is fitted in an outer peripheral surface of an end portion of the exhaust pipe section on the upstream side, an end surface of the large diameter side of the body being brought into contact with a flange fixed on the upstream side exhaust pipe section, and an outer peripheral surface of the spherical sealing body is engaged slidingly with the inside concave surface of a convex spherical portion formed on an end portion of the downstream exhaust pipe section.

In this case, since a vibration absorption part comprising wire mesh is formed on the inner circumferential surface side of the spherical sealing body fitted over the outer circumferential surface of the end portion of the upstream side exhaust pipe section, vibrations of the exhaust pipe from an automobile engine are absorbed by the elasticity of the vibration absorption part of the spherical sealing body, and thus generation of noise due to vibrations of the exhaust pipe and transmission thereof into the interior of the car may be prevented.

It is necessary that the vibration absorption part comprising wire mesh be formed to have a reasonable width covering from the inner circumferential surface side to outer circumferential surface side on which the spherical sealing body is fitted in the outer circumferential surface of the exhaust pipe. In this connection, it has been confirmed that a desired elasticity may be ensured by winding the wire mesh around a core at least two turns at the time the spherical sealing body is produced.

Thus, the sealing part comprises the wire mesh and a refractory material is filled in meshes of the wire mesh and clearances formed along the outer circumferential surface of the spherical sealing body and along the end surface of the large diameter side thereof. When the spherical body is placed in the exhaust pipe joint, the sealing part is disposed against the flange fixed on the upstream side of the exhaust pipe section and against the inside concave spherical portion formed on the end portion of the downstream side of the first exhaust pipe section to seal against those surfaces and hence prevent leakage of exhaust gas from the exhaust pipe joint.

Further objects and advantages of the present invention will be apparent from the following description, reference being had to the accompanying drawings wherein preferred embodiments of the present invention are clearly shown.

BRIEF DESCRIPTION OF THE DRAWINGS

FIG. 1 is a plan view of a wire mesh partially rolled into a cylindrical part;

FIG. 2 is a plan view showing refractory material is put over the unrolled portion of the wire mesh;

FIG. 3 is a plan view showing a preform body;

FIG. 4 is a longitudinal sectional view showing a compression forming process;

FIG. 5 is a longitudinal sectional view showing a spherical sealing body;

DESCRIPTION OF THE PREFERRED EMBODIMENTS

One embodiment of the exhaust pipe joint of this kind which is well known will be described with reference to FIG. 14.

Figure 14:
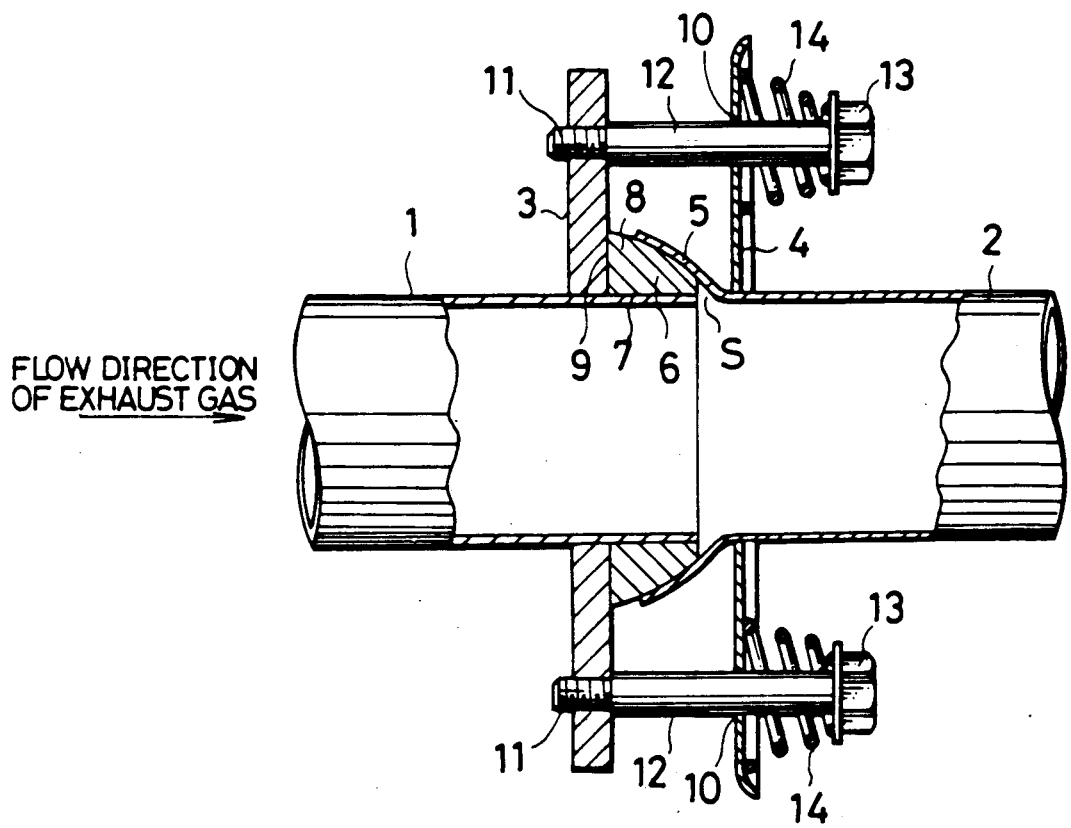
FIG. 14 is a longitudinal cross-sectional view illustrating a prior art.

In FIG. 14, an exhaust pipe 1 on the upstream side (engine side) and an exhaust pipe 2 on downstream side (atmosphere side) are disposed on the same axis opposite each other leaving a slight clearance S between end portions.

A flange 3 is fixed on an outer periphery of the end portion of the pipe 1. Another flange 4 is fixed on an outer periphery of the end portion of the pipe 2. A concave spherical portion 5 is provided on an end edge of the pipe 2. A spherical sealing member 6 is inserted in a space defined by the end edge of the pipe 1, the flange 3 and the concave spherical portion 5. The sealing member 6 has a cylindrical inner circumferential surface 7 fitted in an outer circumferential surface of the pipe 1, a convex outer circumferential surface 8 fitted in the concave spherical portion 5, and a bottom surface 9 on large diameter side abutted against the flange 3.

The flanges 3, 4 are coupled with each other by a pair of bolts 12 passed through a hole 10 of the flange 4 and having a screw 11 set in the flange 3. The flange 4 is urged toward the flange 3 by a coil spring 14 provided between a head 13 of the bolt 12 and the flange 4.

The outer circumferential surface 8 of the sealing member 6 and the concave spherical portion 5 of the pipe 2 are adapted to come in contact movably relatively under pressure on an action of the coil spring 14.

Embodiments of the spherical sealing body according to the present invention will now be described in detail with reference to FIG. 1 to FIG. 13 of the accompanying drawings representing its manufacturing method each.

EMBODIMENT I (1) First Step

A knitted wire mesh 20 having a 3 mm mesh size and a width of 50 mm is prepared using a fine metal wire SUS 403 of 0.28 mm in diameter. The knitted wire mesh 20 is wound around a core 30 two turns to form a partial cylindrical part 21 of the wire mesh 20 (FIG. 1).

(2) Second Step

An expanded graphite sheet of "Nicafilm" (trade name of Nippon Carbide Co.) 0.5 mm thickness and 60 mm width is prepared as a refractory material 40, and the expanded graphite sheet is disposed over the flat or uncoiled portion of the wire mesh 20 on which the partial cylindrical part 21 is formed (FIG. 2). Both are wound cylindrically in succession on the partial cylindrical part 21, and a preform body 50 with the refractory material 40 projecting on end end portion of the preform body 50 is formed (FIG. 3).

(3) Third Step

The preform body 50 is set in a metallic mold 70 provided with a partial concave spherical surface 71 and a mandrel 72 inside so as to be fitted on an outer circumferential surface of the mandrel 72 (FIG. 4). The preform body 50 is compressed along a longitudinal axis of the preform body 50, thereby obtaining a spherical sealing body 80 provided with a cylindrical inner circumferential surface 81 and a partial convex spherical outer circumferential surface 82 (FIG. 5).

The sealing body 80 thus obtained is characterized by a vibration absorption part 83 and a sealing part 84.

The vibration absorption part 83 comprises the wire mesh 20 forming ranging from the inner circumferential surface 81 side to the outer circumferential surface 82 side in a predetermined width.

The sealing part 84 comprises the wire mesh 20 formed on the outer circumferential surface part 82 and the large diameter side end surface of the sealing body 80 to thereby cover the vibration absorption part 83 integrally with the vibration absorption part 83, and the refractory material 40 which fills in the meshes and clearances of the wire mesh 20.

EMBODIMENT II (1) First Step

As in the case of Embodiment I, the knitted wire mesh 20 of 3 mm in mesh size and 50 mm width is prepared by using SUS403 of 0.28 mm in size as fine metal wire. The knitted wire mesh 20 is wound around the core 30 two turns to form the partial cylindrical part 21 on the wire mesh 20 (FIG. 2).

(2) Second Step

As in the case of Embodiment I, an expanded graphite sheet of "Nicafilm" (trade name by Nippon Carbon Co. 0.5 mm thickness and 60 mm width is prepared as the refractory material 40, the expanded graphite sheet then being put over the straight or rest portion of wire mesh 20 on which the partial cylindrical part 21 is formed (FIG. 2). Both are wound cylindrically in succession on the partial cylindrical part 21, and the first preform body 50 with the refractory material 40 projecting on one end portion of the preform 50 is formed (FIG. 3).

(3) Third Step

Figure 6:
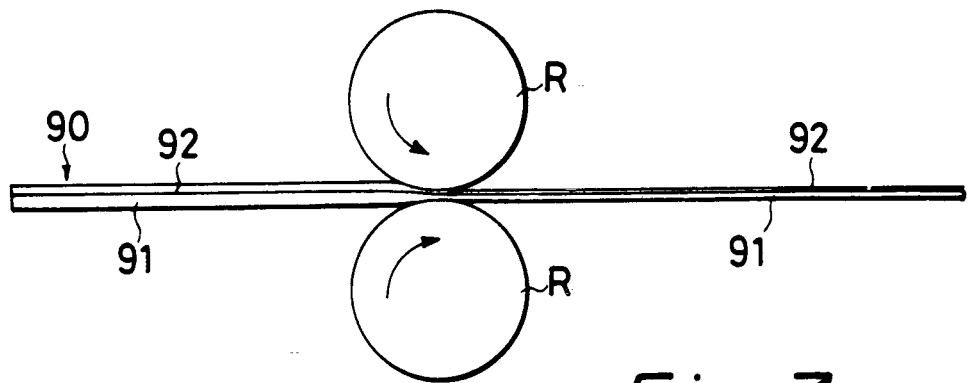
FIG. 6 is a longitudinal sectional view showing a sliding member.

An expanded graphite sheet 91, having the same width as the wire mesh 20, is prepared separately, and a tetrafluoroethylene resin unsintered tape 92 is put over the sheet 91. The two are passed between rollers R, R to compress the tape 92 onto one surface of the sheet 91 to integrate them, thereby forming a tetrafluoroethylene resin layer as a sliding member 90 (FIG. 6).

(4) Fourth Step

Figure 7:
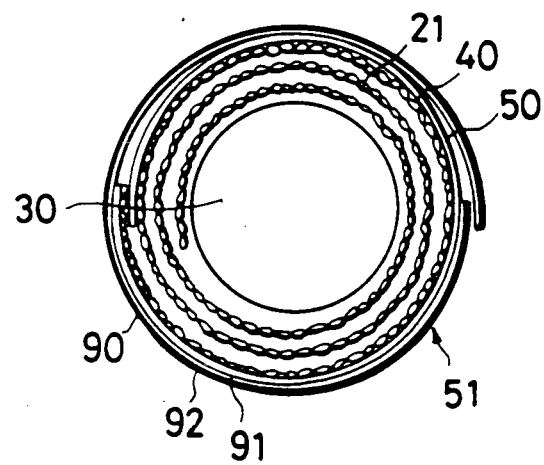
FIG. 7 is a plan view showing a preform body.

With the tape 92 on the outside, the sliding member 90 is wound around the circumferential surface of the preform body 50 obtained through the second process, thereby forming a second preform body 51 (FIG. 7).

(5) Fifth Step

Figure 8:
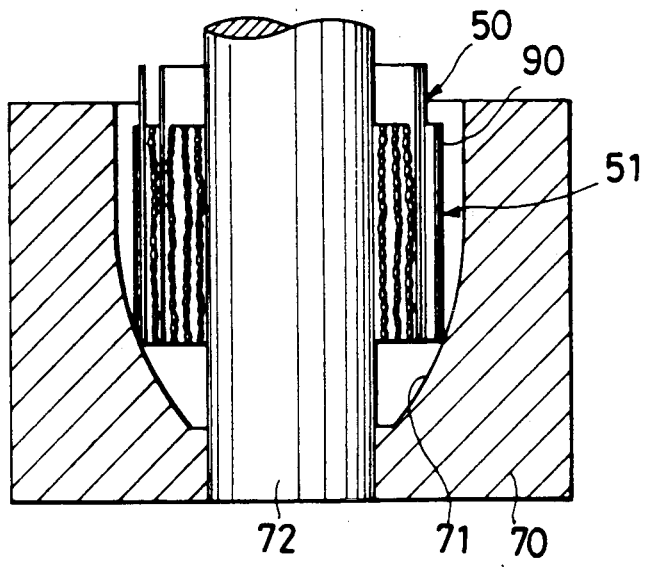
FIG. 8 is a longitudinal sectional view showing a compression forming process.
Figure 9:
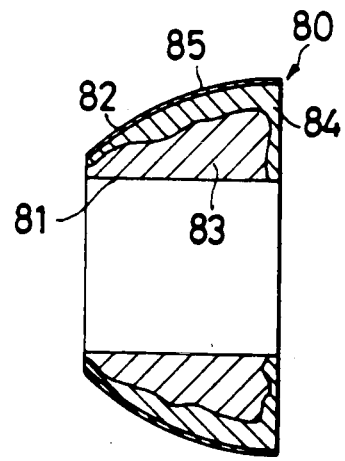
FIG. 9 is a longitudinal sectional view showing a spherical sealing body.

The preform body 51 is set in the metallic mold 70 provided with the partial concave spherical peripheral surface 71 and the mandrel 72 so as to be fitted on an outer circumferential surface of the mandrel 72 (FIG. 8). The preform body 51 is compressed along a longitudinal axis of the preform body 51, thereby obtaining the spherical sealing body 80 provided with the cylindrical inner circumferential surface 81 and the partial convex spherical outer circumferential surface 82 (FIG. 9).

The sealing body 80 thus obtained is provided with a vibration absorption part 83, a sealing part 84, and a sliding face part 85.

The vibration absorption part 83 comprises the wire mesh 20 formed ranging from the inner circumferential surface 81 to the outer circumferential surface 82 in a predetermined width.

The sealing part 84 comprises the wire mesh 20 formed on the outer circumferential surface part 82 and the large diameter side end surface of the sealing body 80 to thereby cover the vibration absorption part 83, and the refractory material 40 filled in meshes and clearances of the wire mesh 20.

The sliding face part 85 comprises the tetrafluoroethylene resin layer of the sliding member 90 covering a convex spherical surface of the sealing member 84 and formed integrally with the sealing member 84.

EMBODIMENT III

The embodiment refers to another manufacturing method of the spherical sealing body given in the aforementioned Embodiment II.

(1) First Step

As in the case of Embodiment I, the knitted wire mesh 20 of 3 mm in mesh size and 50 mm width is prepared by using SUS403 of 0.28 mm in size as fine metal wire. The knitted wire mesh 20 is wound round the core 30 two turns to form the partial cylindrical part 21 on the wire mesh 20 (FIG. 1).

(2) Second Step

Figure 10:
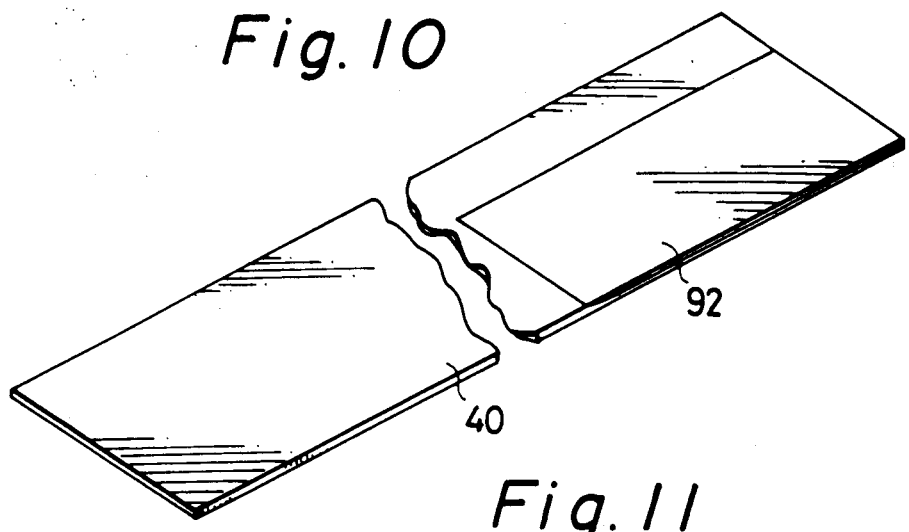
FIG. 10 is a fragmentary perspective view of refractory material.
Figure 11:
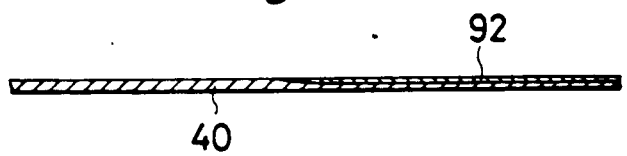
FIG. 11 is a longitudinal sectional views showing a refractory material.
Figure 12:
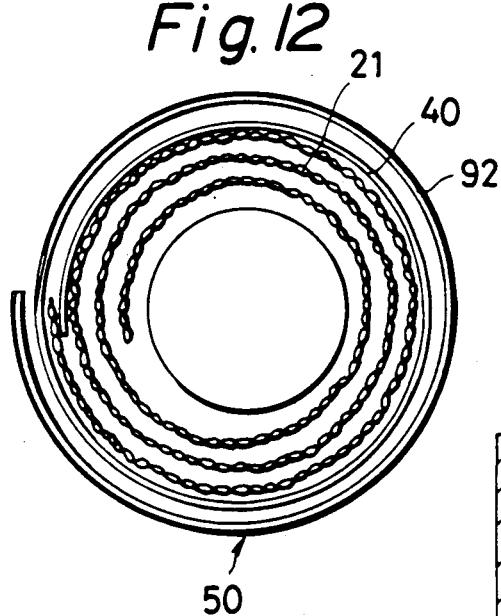
FIG. 12 is a plan view showing a preform body.

An expanded graphite sheet of 0.5 mm thickness and 60 mm width is prepared as the refractory material 40, and the tetrafluoroethylene resin unsintered tape 92 is put over the surface of one end portion of the expanded graphite sheet in a width corresponding to the same width (50 mm) as the wire mesh 20. Both are passed between the rollers R, R and thus compressed to integration, thereby forming a tetrafluoroethylene resin layer on the surface of one end portion of the expanded graphite sheet (FIG. 10 and FIG. 11).

(3) Third Step

Figure 13:
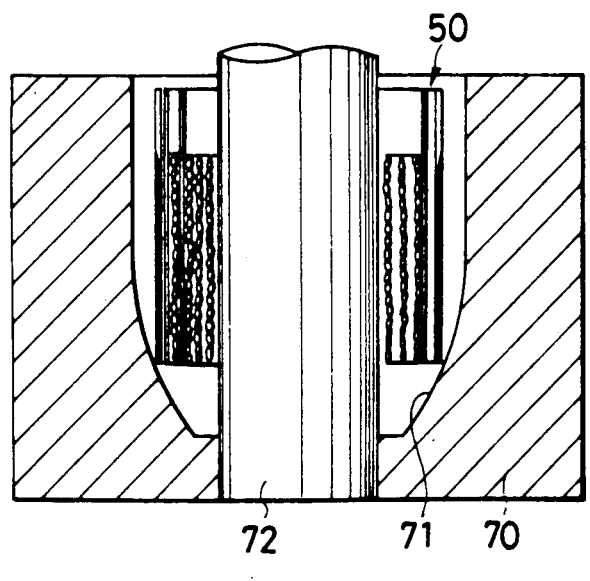
FIG. 13 is a longitudinal sectional view showing a compression forming process.

The refractory material 40, provided with the tetrafluoroethylene resin layer on the surface of one end portion of the expanded graphite sheet, is put over the straight or rest portion of the wire mesh 20 on which the partial cylindrical part 21 is formed, and both are wound cylindrically in succession to the partial cylindrical part 21 so as to position only the refractory material 40 provided with the tetrafluoroethylene resin layer on the outermost periphery, thus forming the preform body 50 with the refractory material 40 projecting on one end portion of the preform body 50 (FIG. 13).

(4) Fourth Step

The preform body 50 is set in the metallic mode 70 provided with the partial concave spherical inner circumferential surface 71 and the mandrel 82 inside so as to be fitted on an outer circumferential surface of the mandrel 72 (FIG. 13). The preform body 50 is compressed along a longitudinal axis of the preform body 50, thereby obtaining the spherical sealing body 80 provided with the cylindrical inner circumferential surface 81 and the partial convex spherical outer circumferential surface 82 (FIG. 9).

The sealing body 80 thus obtained is provided with a vibration absorption part 83, a sealing part 84, and a sliding face part 85.

The vibration part 83 comprises the formed wire mesh 20 ranging from the inner circumferential surface 81 side to the outer circumferential 82 side in a predetermined width. The sealing part 84 comprises the wire mesh 20 formed on the outer circumferential surface part 82 and the large diameter side end surface of the sealing body 80 to thereby cover the vibration absorption part 83, and the refractory material 40 filled in the meshes and clearances of the wire mesh 40.

The sliding face part 85 comprises the tetrafluoroethylene resin layer of the sliding member 90 formed on a convex spherical surface of the sealing member 84.

A function of the sealing member of the spherical sealing body described as above has been affirmed by the following test.

TEST CONDITIONS

The spherical sealing body constructed as described above was incorporated in the exhaust pipe joint shown in FIG. 14, and subjected to a test under the following conditions:

| | |
|---|---|
| Compression Force | 40 kg |
| Angle of oscillation | ±3° |
| Frequency | 10 Hz |
| Atmospheric temperature | Room temperature to 500° F. |
| Pressure in the pipe | 0.3 kg/cm² |

Test Method:

The test comprises 8 cycles each 250,000 in total number of oscillations, a: 45,000 times first with oscillating motion ±3° at 10 Hz in frequency as constituting one time; then atmospheric temperature increased up to 500° C. as keeping the motion on (number of oscillations being 45,000 times, then); oscillating motion at 115,000 times at the point in time when atmospheric temperature reaching 500° F.; atmospheric temperature decreased to room temperature while maintaining the oscillations (number of oscillations being 45,000 times at that time).

A result of the above test is given below.

| | | Cycle number | Gas leakage | Oscillating torque |
|---|---|---|---|---|
| Sealing body of the embodiment according to the present invention | A | 500,000 | 0.6 l/min | 100 kg-cm |
| | | 1,000,000 | 0.6 l/min | |
| | | 1,500,000 | 0.6 l/min | |
| | | 2,000,000 | 0.6 l/min | |
| | B | 500,000 | 0.6 l/min | 60 kg-cm |
| | | 1,000,000 | 0.6 l/min | |
| | | 1,500,000 | 0.6 l/min | |
| | | 2,000,000 | 0.6 l/min | |
| Prior art sealing body (Japanese Patent Publication No. 58-21144) | | 500,000 | 0.6 l/min | 100 kg-cm |
| | | 1,000,000 | 0.5 l/min | |
| | | 1,500,000 | 0.5 l/min | |
| | | 2,000,000 | 0.5 l/min | |

In the above table, the sealing body A is a sealing body provided with an oscillation absorption part 83 and a sealing part 84, and the sealing body B is a sealing body provided with an oscillation absorption part 83, a sealing part 84 and a sliding face part 85.

The above test result has ensured that the sealing body A, B have a sealing function almost equivalent to that of the prior art sealing body (Japanese Patent Publication No. 58-21144).

Then, in addition to the working effect described as above, the spherical sealing body A, B realizes a smoother relative angular motion arising on the exhaust pipes on its upstream and downstream sides, the effect preventing a generation of frictional noise generated by sliding between a protuberant spherical surface portion of the sealing body and a recessed spherical surface portion of the exhaust pipe on upstream side.

The above has been affirmed from a test result of the oscillating torque (kg-cm) carried out under the same conditions as the aforementioned test. The result is also given in the above table. Then, the oscillating torque is a mean value of those obtained at the point in time when each cycle ends.

Many widely different embodiments of the present invention may be constructed without departing from the spirit and scope of the present invention. It should be understood that the present invention is not limited to the specific embodiments described in this specification, except as defined in the appended claims.

What is claimed is:

1. A spherical sealing body for insertion in a space defined by an edge portion of a first section of an exhaust pipe, a flange fixed on an outer periphery of said first exhaust pipe section and a concave spherical portion disposed on an end edge of a second section of the exhaust pipe downstream from the first section, comprising:

a wire mesh body for absorbing the vibrations of the exhaust pipe sections, said wire mesh body being compressed to substantially exclude material detrimental to absorbing vibration therein and in a shape having a cylindrical inner circumferential surface for fitting over the outer circumferential surface of said end edge portion of said exhaust pipe section, a convex outer circumferential surface for fitting within the concave spherical portion of the downstream exhaust pipe section, and a bottom surface for abutting the flange; and a refractory material disposed on said wire mesh body and covering said convex outer circumferential surface and said bottom surface of said wire mesh body but not covering said cylindrical inner circumferential surface for sealing gaps between said wire mesh body and the flange and between said wire mesh body and the concave spherical portion, said refractory material being filled in meshes of said convex outer circumferential surface and said bottom surface of said wire mesh body by compression.

2. A sealing body according to claim 1, wherein the mesh size of said wire mesh body is 3 to 5 mm.

3. A sealing body according to claim 1, wherein said refractory material comprises expanded graphite.

4. A sealing body according to claim 1, wherein said refractory material comprises mica.

5. A sealing body according to claim 1, wherein a part of said wire mesh body corresponding to said convex outer circumferential face is covered by a sliding member through said refractory material.

6. A sealing body according to claim 5, wherein said sliding member is formed integrally with said refractory material.

7. A sealing body according to claim 5, wherein said sliding member comprises tetrafluoroethylene resin.

8. A sealing body according to claim 1, wherein the mesh body is compressed to exclude any material within the meshes of the wire mesh body inwardly of the convex outer circumferential surface covered with refractory material and the bottom surface of the wire mesh body covered with refractory material leaving the interior of the wire mesh body free of any material other than the wire mesh per se and open through the cylindrical inner circumferential surface.

9. A spherical sealing body according to claim 1, wherein the cylindrical inner circumferential surface of the wire mesh body is free of refractory material lying in unsealed relation with the outer circumferential surface of the first exhaust pipe section.

* * * * *